United States Patent
Rousseau (10) Patent No.: US 8,633,293 B2
(45) Date of Patent: *Jan. 21, 2014

(54) SELF-REPAIRING POLYMER

(75) Inventor: Ingrid A. Rousseau, Clinton Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 364 days.

This patent is subject to a terminal disclaimer.

(21) Appl. No.: 12/956,494

(22) Filed: Nov. 30, 2010

(65) Prior Publication Data

US 2012/0136125 A1 May 31, 2012

(51) Int. Cl.
- *C08G 59/40* (2006.01)
- *C08G 59/42* (2006.01)
- *C08G 59/50* (2006.01)
- *C08L 63/00* (2006.01)
- *C08L 63/02* (2006.01)

(52) U.S. Cl.
USPC ........... 528/120; 525/507; 525/523; 528/107; 528/113; 528/121

(58) Field of Classification Search
None
See application file for complete search history.

(56) References Cited

U.S. PATENT DOCUMENTS

| | | | |
|---|---|---|---|
| 6,242,083 B1 * | 6/2001 | McGrail et al. | 428/297.4 |
| 6,248,204 B1 * | 6/2001 | Schuft | 156/305 |
| 6,509,414 B2 * | 1/2003 | Tikart et al. | 525/115 |
| 6,849,195 B2 * | 2/2005 | Basheer et al. | 252/62.54 |
| 2005/0113553 A1 * | 5/2005 | Birnbrich et al. | 528/103 |
| 2008/0292848 A1 * | 11/2008 | Xie et al. | 428/174 |
| 2009/0235754 A1 * | 9/2009 | Tseng et al. | 73/754 |
| 2011/0278052 A1 * | 11/2011 | Hsu | 174/258 |

OTHER PUBLICATIONS

HCAPLUS accession No. 2008:17249 and Derwent accession No. 2008-M02980 for Chinese Patent No. 10109644 A, Liu et al., Jan. 2, 2008, two pages each.*
HCAPLUS accession No. 2008:52917 and Derwent accession No. 2008-M13248 for Chinese Patent No. 101100545 A, Du et al., Jan. 9, 2008, one and two pages, respectively.*
HCAPLUS accession No. 2010:923825 and Derwent accession No. 2010-K70532 for Chinese Patent No. 101781427 A, Leng et al., Jul. 21, 2010, two pages each.*
Sartomer product bulletin for SMA EF-40 Flake, Mar. 2002, p. 2965.*
D.M. Feldkamp, I.A. Rousseau, "Effect of the Deformation Temperature on the Shape-Memory Behavior of Epoxy Networks", Macromolecular Materials and Engineering, 2010, pp. 726-734, vol. 295.
R.S. Trask, H.R. Williams, I.P. Bond, "Self-healing polymer composites: mimicking nature to enhance performance", Bioinspiration & Biomimetics, 2007, pp. 1-9, vol. 2.
P. Cordier, F. Tournilhac, C. Soulie-Ziakovic, L. Leibler, "Self-healing and thermoreversible rubber from supramolecular assembly", Nature, Feb. 21, 2008, pp. 977-980, vol. 451.

* cited by examiner

Primary Examiner — Robert Sellers
(74) Attorney, Agent, or Firm — Quinn Law Group, PLLC (57) ABSTRACT

A polymer includes a reaction product of an epoxy resin, a first crosslinking agent, and a second crosslinking agent. The first crosslinking agent is reactive with the epoxy resin and has a first molecular weight. The second crosslinking agent is reactive with the epoxy resin and has a second molecular weight of at least 2.5 times greater than the first molecular weight. The polymer has a first phase having a first glass transition temperature at which the polymer is transformable between a first shape and a second shape. The second crosslinking agent is crystallizable within the polymer and thereby has a melting temperature that is detectable within the polymer.

16 Claims, 6 Drawing Sheets

SELF-REPAIRING POLYMER

TECHNICAL FIELD

The present disclosure generally relates to a polymer.

BACKGROUND

Polymers are often useful for applications requiring excellent strength, durability, temperature stability, and chemical stability. However, even during standard use, polymers may become damaged as a result of dents, knicks, and the like. Such damage often decreases an expected usage life of a polymer.

Shape-memory polymers may be specifically useful for applications requiring temperature-dependent, i.e., thermally-activated, transitions between a first, permanent shape and a second, temporary shape. The temperature-dependent transitions generally occur at a specific transformation temperature based on a composition of the shape-memory polymer.

SUMMARY

A polymer includes a reaction product of an epoxy resin, a first crosslinking agent, and a second crosslinking agent. The first crosslinking agent is reactive with the epoxy resin and has a first molecular weight. The second crosslinking agent is reactive with the epoxy resin and has a second molecular weight of at least 2.5 times greater than the first molecular weight. Further, the polymer has a first phase having a first glass transition temperature at which the polymer is transformable between a first shape and a second shape. The second crosslinking agent is crystallizable within the polymer and thereby has a melting temperature that is detectable within the polymer.

In one variation, the polymer includes the reaction product of the epoxy resin, a first amine reactive with the epoxy resin and having a first molecular weight of less than or equal to approximately 250 g/mol, and a second amine reactive with the epoxy resin and having a second molecular weight of greater than or equal to approximately 600 g/mol. The second amine is crystallizable within the polymer and thereby has a melting temperature that is detectable within the polymer. In addition, the second amine includes at least one pendant group covalently crosslinked to the epoxy resin and at least one pendant group mobile within the polymer at a temperature greater than the melting temperature. The polymer also has a second phase having a second glass transition temperature that is lower than the first glass transition temperature.

In another variation, the polymer includes a reaction product of a diglycidyl ether of bisphenol-A-based epoxy resin, a first etheramine, and a second oligomeric etheramine. The first etheramine is reactive with the diglycidyl ether of bisphenol-A-based epoxy resin and has a first molecular weight of less than or equal to approximately 250 g/mol. The second etheramine is reactive with the diglycidyl ether of bisphenol-A-based epoxy resin and has a second molecular weight of greater than or equal to approximately 600 g/mol. The second oligomeric etheramine has a polyether backbone including ethylene oxide and propylene oxide in a ratio of ethylene oxide to propylene oxide of from about 0.1:1 to about 0.5:1, is crystallizable within the polymer, and thereby has a melting temperature that is detectable within the polymer. Further, the second oligomeric etheramine includes at least one pendant group covalently crosslinked to the diglycidyl ether of bisphenol-A-based epoxy resin and at least one pendant group mobile within the polymer at a temperature greater than the melting temperature.

The polymer exhibits excellent shape-memory properties and is capable of self-repair. More specifically, the polymer is transformable between the first shape and the second shape at elevated first glass transition temperatures, and is capable of scratch- and indentation-repair when heated to a temperature above the first glass transition temperature. Further, the polymer has excellent strength, deformability, thermal and chemical stability, and shape-memory properties.

The above features and advantages and other features and advantages of the present disclosure are readily apparent from the following detailed description of the best modes for carrying out the disclosure when taken in connection with the accompanying drawings.

DETAILED DESCRIPTION

Figure 1:
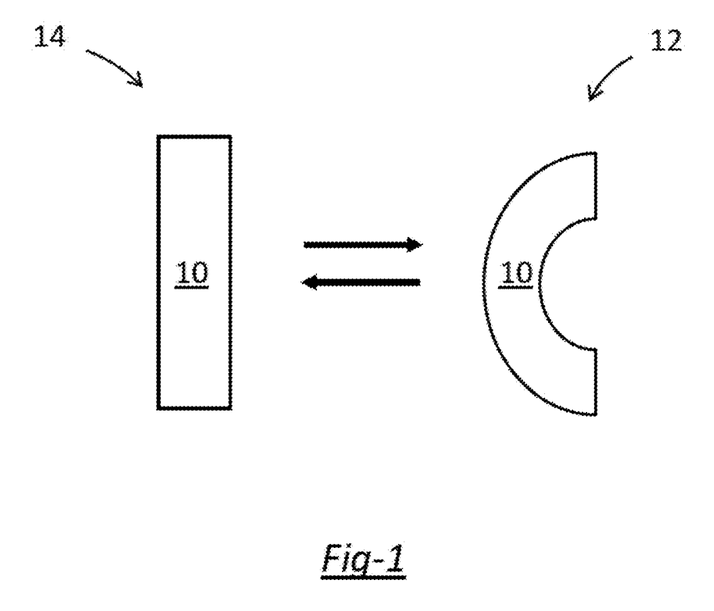
FIG. 1 is a schematic illustration of a polymer, wherein the polymer is transformable between a first shape and a second shape.

Referring to the Figures, wherein like reference numerals refer to like elements, a polymer is shown generally at 10 in FIG. 1. The polymer 10 may be useful for applications, such as structural applications, requiring materials having shape-memory properties, e.g., deformability at elevated temperatures, and self-repairing properties, e.g., an ability to repair scratches and indentations, as set forth in more detail below. For example, the polymer 10 may be useful for automotive, aerospace, robotic, construction, and other transportation and industrial applications requiring excellent self-repair and deformability where elevated transformation temperatures may be desired.

With continued reference to FIG. 1, the polymer 10 may be characterized as a shape-memory polymer. As used herein, the terminology "shape-memory" refers to a material capable of memorizing a second shape (denoted at 12 in FIG. 1), i.e., a temporary shape, and recovering a first shape (denoted at 14 in FIG. 1), i.e., an original or permanent shape, by thermal-, light-, electro-activation, magneto-activation, or solvent (e.g., water or other organic solvents in liquid or vapor form) absorption. That is, the shape-memory polymer may be capable of transitioning between one or more different shapes 12, 14, forms, or configurations.

Shape-memory polymers, which may also be referred to as "smart polymers", are polymers or compositions that have an ability to "remember" the first shape 14, i.e., the original, permanent shape that is formed by a curing reaction of the polymer 10 including covalent crosslinking between individual polymer chains. The polymer 10 may be deformed to the second shape 12, i.e., the temporary shape, by simultaneously applying a desired deformation and a change in temperature. The first shape 14 may be subsequently "recovered" by applying an external stimulus, e.g., an activation signal such as a change in temperature, to the polymer 10. That is, the polymer 10 may have a specific transformation temperature, $T_{trans}$, at which the polymer 10 transitions between the first shape 14 and the second shape 12. As the ambient temperature is increased to above the transformation temperature, $T_{trans}$, of the polymer 10, the first shape 14 of the polymer 10 may be spontaneously recovered provided that there are no external space constraints preventing the shape recovery.

Deformation of the polymer 10 from the first shape 14 to the second shape 12 may be a temporary condition. Therefore, shape-memory polymers may be thermally-activated smart materials and may transition between shapes 12, 14 or configurations via heating and cooling according to a glass transition or melting temperature of the shape-memory polymer, as set forth in more detail below.

Further, although shown as a bar or strip in FIG. 1, the polymer 10 may have any suitable form, configuration, shape, or thickness. For example, the polymer 10 may have a form of a shape-changing element. That is, the polymer 10 may have a form selected from the group of springs, tapes, wires, bands, continuous loops, and combinations thereof. Alternatively, the polymer 10 may have a form of a structural element, such as, but not limited to, a panel, beam, strut, support, truss, and combinations thereof. In one non-limiting variation, the polymer 10 may be formed as a body component of a vehicle (not shown). For example, the polymer 10 may be formed as a body panel, roof panel, hood, trunk lid, bumper, fascia, or wheel well. Alternatively or additionally, the polymer 10 may also be in the form of a thin film for coating applications. That is, the polymer 10 may be a thin-film coating for application to a substrate (not shown).

The polymer 10 includes a reaction product of an epoxy resin, a first crosslinking agent, and a second crosslinking agent as follows.

The epoxy resin may include monomers or short-chain polymers attached to at least one epoxide group, i.e., a cyclic ether having three ring atoms. Suitable epoxy resins include derivatives of bisphenol-A. For example, the epoxy resin may be a diglycidyl ether of bisphenol-A-based epoxy resin. More specifically, the epoxy resin may be represented by the general structure:

wherein m is from about 0.05 to about 0.2. Further, the epoxy resin may have a molecular weight of from approximately 350 g/mol to approximately 400 g/mol, e.g., from approximately 360 g/mol to approximately 385 g/mol. As used herein, the terminology "molecular weight" refers to a method of characterizing a polymer according to the ordinary arithmetic mean or average of the molecular weights of individual macromolecules of the polymer 10. That is, the molecular weight referenced herein is a number average molecular weight. The number average molecular weight may be determined by measuring the molecular weight of n polymer molecules, summing the individual molecular weights, and dividing by n. As such, the molecular weight is generally an approximate value. Specific examples of suitable epoxy resins include EPON™ Resin 826, commercially available from Hexion Specialty Chemicals, Inc. of Columbus, Ohio, and D.E.R. 383, commercially available from The Dow Chemical Company of Midland, Mich.

The first crosslinking agent is reactive with the epoxy resin and has a first molecular weight. The first crosslinking agent may be selected according to functional group reactivity with the epoxy resin. For example, the first crosslinking agent may be selected from the group of phenolics, amines, anhydrides, carboxylic acids, aldehydes, and combinations thereof. In one non-limiting example, the first crosslinking agent may be an amine, such as, but not limited to, an etheramine. As used herein, the terminology "etheramine" refers to a material having a polyether backbone and at least one amino group attached to the polyether backbone. The polyether backbone may be propylene oxide-based, ethylene oxide-based, polyethylene glycol-based, polypropylene glycol-based, polytetramethylene glycol-based, and combinations thereof. In one non-limiting variation, the polyether backbone may be both ethylene oxide- and propylene oxide-based. The first crosslinking agent may be, for example, a monoamine or a diamine. Specific examples of suitable first crosslinking agents are commercially available from Huntsman International LLC of The Woodlands, Tex., under the trade name JEFFAMINE®.

More specifically, the first molecular weight may be less than or equal to approximately 250 g/mol. For example, the first crosslinking agent may be an etherdiamine having a first molecular weight of less than or equal to approximately 230 g/mol. In this example, the etherdiamine may be propylene oxide-based and may be represented by the general structure:

wherein x is about 2.5. In another non-limiting variation, the first crosslinking agent may be an etherdiamine having a first molecular weight of less than or equal to approximately 150 g/mol. The etherdiamine may be represented by the general structure:

wherein x=2. As such, the first crosslinking agent may be a relatively short-chain molecule as compared to the second crosslinking agent and epoxy resin. Specific suitable examples of the first crosslinking agent are commercially available from Huntsman International LLC of The Woodlands, Tex., under the trade names JEFFAMINE® EDR-148 and JEFFAMINE® D-230.

The second crosslinking agent is reactive with the epoxy resin and has a second molecular weight of at least 2.5 times greater than the first molecular weight. More specifically, the second molecular weight may be from approximately 600 g/mol to approximately 2,000 g/mol. Without intending to be limited by theory, the second molecular weight that is at least 2.5 times the first molecular weight may provide the polymer 10 with excellent deformability, as set forth in more detail below.

The second crosslinking agent may also be selected according to functional group reactivity with the epoxy resin. For example, the second crosslinking agent may be selected from the group of phenolics, amines, anhydrides, carboxylic acids, aldehydes, and combinations thereof. In one non-limiting example, the second crosslinking agent may be an amine, such as, but not limited to, an oligomeric amine. As used herein, the terminology "oligomeric" refers a material having a few monomer units, e.g., a dimer, trimer, or tetramer. For example, the second crosslinking agent may be an oligomeric etheramine.

The second crosslinking agent may be an amine having a polyether backbone and at least one amino group attached to the polyether backbone. The polyether backbone of the second crosslinking agent may include ethylene oxide and propylene oxide. That is, the second crosslinking agent may include a mixture of ethylene oxide and propylene oxide and, as such, may be ethylene oxide- and propylene oxide-based. A ratio of ethylene oxide to propylene oxide in the second crosslinking agent may be less than about 1:1. For example, the ratio may be from about 0.1:1 to about 0.5:1. Without intending to be limited by theory, the aforementioned ratio may contribute to both the excellent deformability of the polymer 10 and the elevated transformation temperatures, $T_{trans}$, as set forth in more detail below. That is, as the amount of ethylene oxide in the second crosslinking agent increases, a deformability of the polymer 10 may also increase. The ratio of ethylene oxide to propylene oxide of the second crosslinking agent of less than or equal to about 1:1 may also contribute to phase separation within the polymer 10, as set forth in more detail below.

The second crosslinking agent is crystallizable within the polymer 10 and thereby has a melting temperature, $T_m$, that is detectable within the polymer 10. As used herein, the terminology "melting temperature" refers to a temperature at which a material changes from a solid state to a liquid state, i.e., the temperature at which the material melts. Further, the terminology "crystallizable" refers to a propensity to form crystals within the polymer 10. Therefore, the second crosslinking agent may have a detectable or measureable melting temperature, $T_m$, within the polymer 10 after the polymer 10 is cured. For example, the second crosslinking agent may have a melting temperature, $T_m$, of from about 10° C. to about 40° C.

More specifically, the second crosslinking agent may include at least one pendant group covalently crosslinked to the epoxy resin and at least one pendant group mobile within the polymer at a temperature greater than the melting temperature, $T_m$. That is, a portion of the second crosslinking agent may be permanently crosslinked to the epoxy resin during cure of the polymer 10. However, another portion of the second crosslinking agent may be mobile within the polymer 10 when the polymer 10 is exposed to a temperature greater than the melting temperature, $T_m$, of the second crosslinking agent. That is, the at least one mobile pendant group may melt micro-crystalline sites formed by the second crosslinking agent within the polymer 10. The mobility of the at least one pendant group at temperatures above the melting temperature, $T_m$, may contribute to self-repair of the polymer 10.

Figure 4A:
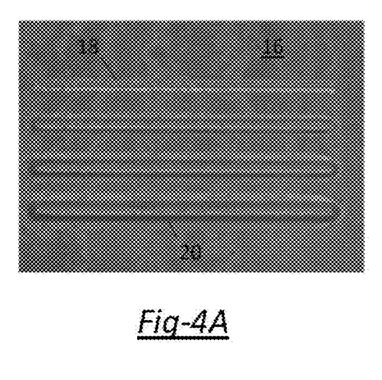
FIG. 4A is an image of the polymer of Example 1, wherein a surface of the polymer defines a scratch and an indentation.
Figure 4B:
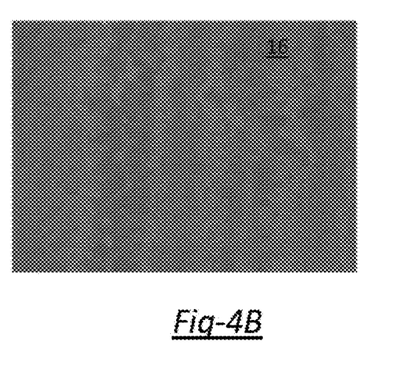
FIG. 4B is an image of the polymer of FIG. 4A after the polymer is heated to above a transformation temperature of the polymer.

For example, during use, the polymer 10 may become scratched. That is, referring to FIGS. 4A and 4B, a portion of a surface 16 of the polymer 10 may be removed by abrasion to define at least one groove (represented generally by 18 in FIG. 4A) or scratch in the surface 16. Upon heating the polymer 10 to a temperature above the melting temperature, $T_m$, of the second crosslinking agent, the at least one mobile pendant group, which may also be a pendant chain, may move within the polymer 10 towards the at least one groove 18, fill in the at least one groove 18, and thereby repair the polymer 10, as shown in FIG. 4B. That is, the at least one mobile pendant group may eliminate the at least one groove 18 so as to repair the polymer 10. As such, consecutive damage at the same location in the polymer 10 may be repeatedly repaired since there may be no depletion of the at least one mobile pendant group of the second crosslinking agent within the polymer 10. Additionally, the polymer 10 may not require catalyst and/or additives for self-repair.

As a non-limiting example, the second crosslinking agent may be an etherdiamine having a second molecular weight of from approximately 900 g/mol to approximately 2,000 g/mol. In this example, the etherdiamine may be propylene oxide- and ethylene oxide-based and may be represented by the general structure:

wherein (x+z) is about 6, and y is about 12.5 for the etherdiamine having a second molecular weight of approximately 900 g/mol. In another example, (x+z) is about 6 and y is about 39 for the etherdiamine having a second molecular weight of approximately 2,000 g/mol. In another non-limiting variation, the second crosslinking agent may be an ethermonoamine having a second molecular weight of from approximately 600 g/mol to approximately 2,000 g/mol. For this variation, the ethermonoamine may be propylene oxide- and ethylene oxide-based and may be represented by the general structure:

wherein x is about 1 and y is about 9 for the ethermonoamine having a second molecular weight of approximately 600 g/mol. In another example, x is about 19 and y is about 3 for the ethermonoamine having a second molecular weight of approximately 1,000 g/mol. Further, x is about 6 and y is from about 25 to about 40, e.g., from about 29 to about 35, for the ethermonoamine having a second molecular weight of approximately 2000 g/mol. Specific suitable examples of the second crosslinking agent are commercially available from Huntsman International LLC of The Woodlands, Tex., under the trade names JEFFAMINE® ED-900, JEFFAMINE® ED-2003, JEFFAMINE® M-600, JEFFAMINE® M-1000, JEFFAMINE® M-2005, and JEFFAMINE® M-2070.

The polymer 10 has a first phase having a first glass transition temperature, $T_{g1}$. That is, the first glass transition temperature, $T_{g1}$, is associated with the first phase. As used herein, the terminology "glass transition temperature" refers to a temperature at which the polymer 10 or a constituent of the polymer 10 transforms from a harder, glass-like state to a softer, rubbery state. Glass transition temperature defines the aforementioned transformation as a change in mechanical properties of the polymer 10. Although set forth in more detail below, glass transition temperatures may be measured by dynamic mechanical analysis at an apex of a tan δ curve of the polymer 10, wherein δ is the loss angle of the polymer 10. Glass transition temperatures may also be measured by differential scanning calorimetry. In this case, glass transition temperatures are determined at a step in heat flow signal.

The first phase of the polymer 10 may be characterized as epoxy-rich and continuous. That is, the epoxy resin may be present in the first phase in an amount of greater than 50 parts by weight based on 100 parts by weight of the first phase. Stated differently, the first phase may include more of the epoxy resin than any other component of the first phase. The first glass transition temperature, $T_{g1}$, may be greater than or equal to about 35° C. For example, the first glass transition temperature, $T_{g1}$, may be from about 37° C. to about 99° C. Although set forth in more detail below, the polymer 10 may transform from the permanent first shape 14 to the temporary second shape 12 at the first glass transition temperature, $T_{g1}$, when an external force is applied to the polymer 10 to thereby assist the shape change. That is, the first glass transition temperature, $T_{g1}$, may correspond to the transformation temperature, $T_{trans}$, of the polymer 10. Thereafter, in contrast, only thermal activation may trigger the polymer 10 to transform from the temporary second shape 12 to the permanent first shape 14.

The polymer 10 may also have a second phase having a second glass transition temperature, $T_{g2}$, that is lower than the first glass transition temperature, $T_{g1}$. That is, the polymer 10 may be characterized as biphasic. In contrast to the first phase, the second phase may be characterized as polyether-rich, e.g., ethylene oxide- and/or propylene oxide-rich. Therefore, the second glass transition temperature, $T_{g2}$, may be sub-zero and correspond to the glass transition of a polyether constituent of the polymer 10. Therefore, the second glass transition temperature, $T_{g2}$, is associated with the second phase and may be different from the first glass transition temperature, $T_{g1}$, of the first phase.

Decreasing the ratio of ethylene oxide to propylene oxide of the second crosslinking agent as set forth above may promote formation of the first, epoxy-rich phase and the second, polyether-rich phase, wherein the first phase is immiscible within the second phase. These results may be attributable to a comparatively lower compatibility between ethylene oxide segments and the epoxy resin of the polymer 10 as compared to the compatibility of propylene oxide segments and the epoxy resin. For example, for polymers including a second crosslinking agent having a relatively higher propylene oxide content, i.e., lower ratio of ethylene oxide to propylene oxide, may be less likely to crystallize than polymers 10 including a second crosslinking agent having a relatively lower propylene oxide content. Propylene oxide may be generally less likely to crystallize than ethylene oxide as a result of a pendant methyl side group according to the general structures:

propylene oxide    ethylene oxide

Conversely, second crosslinking agents having relatively lower propylene oxide contents may be more likely to crystallize and exhibit a melting temperature, $T_m$.

Referring again to FIG. 1, the polymer 10 is transformable between the first shape 14 and the second shape 12 at the first glass transition temperature, $T_{g1}$. That is, the polymer 10 may exhibit shape-memory properties and transition between the first shape 14 and the second shape 12. Moreover, the polymer 10 may exhibit excellent deformability and storage modulus at elevated first glass transition temperatures, $T_{g1}$. That is, the polymer 10 may not fail under a tensile strain of less than about 10% at elevated first glass transition temperatures, $T_{g1}$, of greater than about 35° C.

The presence of the first phase within the polymer 10 may also contribute to self-repair of the polymer 10. Referring to FIGS. 4A and 4B, during use, the surface 16 of the polymer 10 may be indented to define at least one indentation 20 in the surface 16. Upon heating the polymer 10 to a temperature above the first glass transition temperature, $T_{g1}$, of the polymer 10, the polymer 10 may transition between the second shape 12 and the first shape 14, remove the at least one indentation 20, and thereby repair the polymer 10. That is, the shape change between the second shape 12 and the first shape 14 may eliminate the at least one indentation 20 so as to repair the polymer 10. Therefore, consecutive damage at the same location in the polymer 10 may be repeatedly repaired.

Referring again to FIGS. 4A and 4B, during use, the surface 16 of the polymer 10 may also be both scratched to define the at least one groove 18 and indented to define the at least one indentation 20, as set forth above. Upon heating the polymer 10 to a temperature above the first glass transition temperature, $T_{g1}$, of the polymer 10, which is greater than the melting temperature, $T_m$, of the second crosslinking agent, the polymer 10 may self-repair both the groove 18 and indentation 20. That is, the at least one mobile pendant group, which may also be a pendant chain, may move within the polymer 10 towards the groove 18, fill in the at least one groove 18, and thereby repair the polymer 10. Concurrently, the polymer 10 may transition between the second shape 12 and the first shape 14, remove the at least one indentation 20, and thereby repair the polymer 10. Therefore, the at least one mobile pendant group may eliminate the at least one groove 18 while the transition between the second shape 12 and the first shape 14 eliminates the at least one indentation 20 to thereby repair the polymer 10.

Further, the polymer 10 may be a thermoset polymer. As used herein, the terminology "thermoset" refers to a polymer 10 that is set by heating the polymer 10 to a curing temperature at which the polymer 10 melts and flows, then covalently crosslinks to set the polymer 10 into the first shape 14. That is, the thermoset polymer 10 irreversibly cures through crosslinking during the curing reaction of the polymer 10.

In contrast, a thermoplastic polymer includes polymer chains that are not covalently crosslinked, but rather are physically crosslinked so that the polymer may be repeatedly melted and molded. Generally, no chemical change occurs in a thermoplastic polymer as the polymer is set in shape. Further, thermoplastic polymers generally have relatively higher ultimate strains, and therefore higher deformation strains because of greater potential for molecular motion, as compared to the thermoset polymer 10. Thermoplastic polymers also generally have a low glass transition temperature as compared to the thermoset polymer 10. Examples of thermoplastic polymers include, but are not limited to, polyamide, polybutyl terephthalate, polyethylene terephthalate, polycarbonate, polyethylene, polypropylene, and polyvinyl chloride.

In one variation, the polymer 10 includes a reaction product of the epoxy resin, a first amine reactive with the epoxy resin and having the first molecular weight of less than or equal to approximately 250 g/mol, and the second amine reactive with the epoxy resin and having the second molecular weight of greater than or equal to approximately 600 g/mol.

The second amine is crystallizable within the polymer 10 and thereby has a melting temperature, $T_m$, that is detectable within the polymer 10. In this variation, the second amine includes at least one pendant group covalently crosslinked to the epoxy resin and at least one pendant group mobile within the polymer 10 at a temperature greater than the melting temperature, $T_m$. As a non-limiting example, the second amine may be an oligomeric etherdiamine. In another non-limiting example, the second amine may be an oligomeric ethermonoamine. Therefore, the second amine may have a polyether backbone and at least one amino group attached to the polyether backbone. Further, the polyether backbone may include ethylene oxide and propylene oxide. A ratio of ethylene oxide to propylene oxide in the second amine may be less than about 0.5:1. For example, the ratio may be from about 0.2:1 to about 0.4:1.

In addition, the polymer 10 has the first phase having the first glass transition temperature, $T_{g1}$, and the second phase having the second glass transition temperature, $T_{g2}$, that is lower than the first glass transition temperature, $T_{g1}$. The polymer 10 is transformable between the first shape 14 and the second shape 12 at the first glass transition temperature, $T_{g1}$.

In another variation, the polymer 10 includes a reaction product of a diglycidyl ether of bisphenol-A-based epoxy resin, a first etheramine, and a second oligomeric etheramine. The first etheramine is reactive with the diglycidyl ether of bisphenol-A-based epoxy resin and has a first molecular weight of less than or equal to approximately 250 g/mol. The second etheramine is reactive with the diglycidyl ether of bisphenol-A-based epoxy resin and has a second molecular weight of greater than or equal to approximately 600 g/mol.

The second oligomeric etheramine has the polyether backbone including ethylene oxide and propylene oxide in a ratio of ethylene oxide to propylene oxide of from about 0.1:1 to about 0.5:1, is crystallizable within the polymer 10, and thereby has a melting temperature, $T_m$, that is detectable within the polymer 10. In addition, the second oligomeric etherdiamine includes at least one pendant group covalently crosslinked to the diglycidyl ether of bisphenol-A-based epoxy resin and at least one pendant group mobile within the polymer 10 at a temperature greater than the melting temperature, $T_m$.

Further, the polymer 10 has the first phase having a first glass transition temperature, $T_{g1}$, and the second phase having the second glass transition temperature, $T_{g2}$, that is lower than the first glass transition temperature, $T_{g1}$. The polymer 10 is transformable between the first shape 14 and the second shape 12 at the first glass transition temperature, $T_{g1}$.

The polymer 10 exhibits excellent shape-memory properties and is capable of self-repair. More specifically, the polymer is transformable between the first shape 14 and the second shape 12 at elevated first glass transition temperatures, $T_{g1}$, and is capable of scratch- and indentation-repair upon exposure to a temperature above the first glass transition temperature, $T_{g1}$. Further, the polymer 10 has excellent strength, e.g., a modulus of from about 1.3 GPa to about 2.4 GPa, deformability, thermal stability, e.g., stability up to about 250° C., chemical stability, and excellent shape-memory properties, e.g., shape fixing and shape recovery of greater than about 95%.

The following examples are meant to illustrate the disclosure and are not to be viewed in any way as limiting to the scope of the disclosure.

EXAMPLES

To prepare the polymers of Examples 1-13, components ER1, ER2, D1-D4, and M1-M4 are combined in the amounts listed in Table 1. Specifically, the components listed in Table 1 are added and mixed manually prior to degassing at about room temperature to form a mixture for each of Examples 1-13. Each mixture is poured into a glass mold coated with Chemlease® 5037 mold release agent, commercially available from Chem Trend of Howell, Mich. Each mold is sealed, and each mixture is cured for 2 hours at 80° C. and 2 hours at 125° C. to form the respective polymers of Examples 1-13. Each polymer is formed as a plaque having a thickness of about 3.0 mm. The nomenclature CA1 in Table 1 refers to a first crosslinking agent and the nomenclature CA2 refers to a second crosslinking agent.

TABLE 1

Polymer Compositions

| Sample | Epoxy Resin | CA 1 | CA 2 | Epoxy:CA1 (mol:mol) | PEA2:CA1 (mol:mol) |
|---|---|---|---|---|---|
| Ex. 1 | ER1 | D1 | D3 | 1.0 | 1.02 |
| Ex. 2 | ER1 | D1 | D3 | 1.0 | 0.49 |
| Ex. 3 | ER1 | D1 | D3 | 1.0 | 0.34 |
| Ex. 4 | ER1 | D1 | D3 | 1.0 | 0.25 |
| Ex. 5 | ER2 | D1 | D3 | 1.0 | 0.32 |
| Ex. 6 | ER2 | D1 | D4 | 1.0 | 0.12 |
| Ex. 7 | ER2 | D1 | D3 | 1.0 | 0.02 |
| Ex. 8 | ER2 | D1 | D4 | 1.0 | 0.02 |
| Ex. 9 | ER2 | D1 | M1 | 1.0 | 0.44 |
| Ex. 10 | ER2 | D1 | M2 | 1.0 | 0.24 |
| Ex. 11 | ER2 | D1 | M3 | 1.0 | 0.12 |
| Ex. 12 | ER2 | D1 | M4 | 1.0 | 0.12 |
| Ex. 13 | ER1 | D2 | M3 | 1.0 | 0.13 |

Component ER1 is a diglycidyl ether of bisphenol-A epoxy resin having a molecular weight of approximately 364 g/mol. Component ER1 is commercially available under the trade name EPON™ Resin 826 from Hexion Specialty Chemicals, Inc. of Columbus, Ohio.

Component ER2 is a diglycidyl ether of bisphenol-A epoxy resin having a molecular weight of approximately 383 g/mol. Component ER2 is commercially available under the trade name D.E.R. 383 from The Dow Chemical Company of Midland, Mich.

Component D1 is an ethylene oxide-based etherdiamine having a first molecular weight of approximately 148 g/mol. Component D1 is commercially available under the trade name JEFFAMINE® EDR-148 from Huntsman International LLC of The Woodlands, Tex.

Component D2 is a propylene oxide-based etherdiamine having a second molecular weight of approximately 230 g/mol. Component D2 is commercially available under the trade name JEFFAMINE® D-230 from Huntsman International LLC of The Woodlands, Tex.

Component D3 is a propylene oxide- and ethylene oxide-based etherdiamine having a second molecular weight of approximately 900 g/mol and a ratio of propylene oxide to ethylene oxide of 0.48:1. Component D3 is commercially available under the trade name JEFFAMINE® ED-900 from Huntsman International LLC of The Woodlands, Tex.

Component D4 is a propylene oxide- and ethylene oxide-based etherdiamine having a second molecular weight of approximately 2,000 g/mol and a ratio of propylene oxide to ethylene oxide of 0.15:1. Component D4 is commercially available under the trade name JEFFAMINE® ED-2003 from Huntsman International LLC of The Woodlands, Tex.

Component M1 is a propylene oxide- and ethylene oxide-based ethermonoamine having a second molecular weight of approximately 600 g/mol and a ratio of propylene oxide to ethylene oxide of 9:1. Component M1 is commercially available under the trade name JEFFAMINE® M-600 from Huntsman International LLC of The Woodlands, Tex.

Component M2 is a propylene oxide- and ethylene oxide-based ethermonoamine having a second molecular weight of approximately 1,000 g/mol and a ratio of propylene oxide to ethylene oxide of 0.16:1. Component M2 is commercially available under the trade name JEFFAMINE® M-1000 from Huntsman International LLC of The Woodlands, Tex.

Component M3 is a propylene oxide- and ethylene oxide-based ethermonoamine having a second molecular weight of approximately 2,000 g/mol and a ratio of propylene oxide to ethylene oxide of 4.83:1. Component M3 is commercially available under the trade name JEFFAMINE® M-2005 from Huntsman International LLC of The Woodlands, Tex.

Component M4 is a propylene oxide- and ethylene oxide-based ethermonoamine having a second molecular weight of approximately 2,000 g/mol and a ratio of propylene oxide to ethylene oxide of 0.32:1. Component M4 is commercially available under the trade name JEFFAMINE® M-2070 from Huntsman International LLC of The Woodlands, Tex.

Each of the polymers of Examples 1-13 is evaluated according to the test procedures set forth below.

Equilibrium Mechanical Properties

The polymers of Examples 1-13 are evaluated on a TA Instruments Q800 Dynamic Mechanical Analyzer (DMA) equipped with a single cantilever fixture. Each sample is prepared from the respective plaque having a thickness of 3 mm by machining the plaque into strips having a length of about 25 mm and a width of 12.5 mm. Heating and cooling are controlled by a Gas Cooling Accessory (GCA) cooling system with liquid nitrogen, and the Poisson's ratio is set at a default value of 0.44. Four virgin specimens of each polymer of Examples 1-13 are evaluated to determine average values of the storage modulus (E'), loss modulus (E"), and loss angle (δ) for the polymers. Each evaluation is performed in "multi-frequency, strain" mode at 1 Hz and 0.2% strain. Each specimen is equilibrated at a temperature, T, wherein $T \leq T_{trans} - 50°$ C. and $T_{trans}$ is a transformation temperature of the respective polymer. After equilibration, each specimen is held isothermally for 3 minutes at T, and heated at 2° C./min to a second temperature, $T_2$, wherein $T_2 \geq T_{trans} + 50°$ C.

Figure 2:
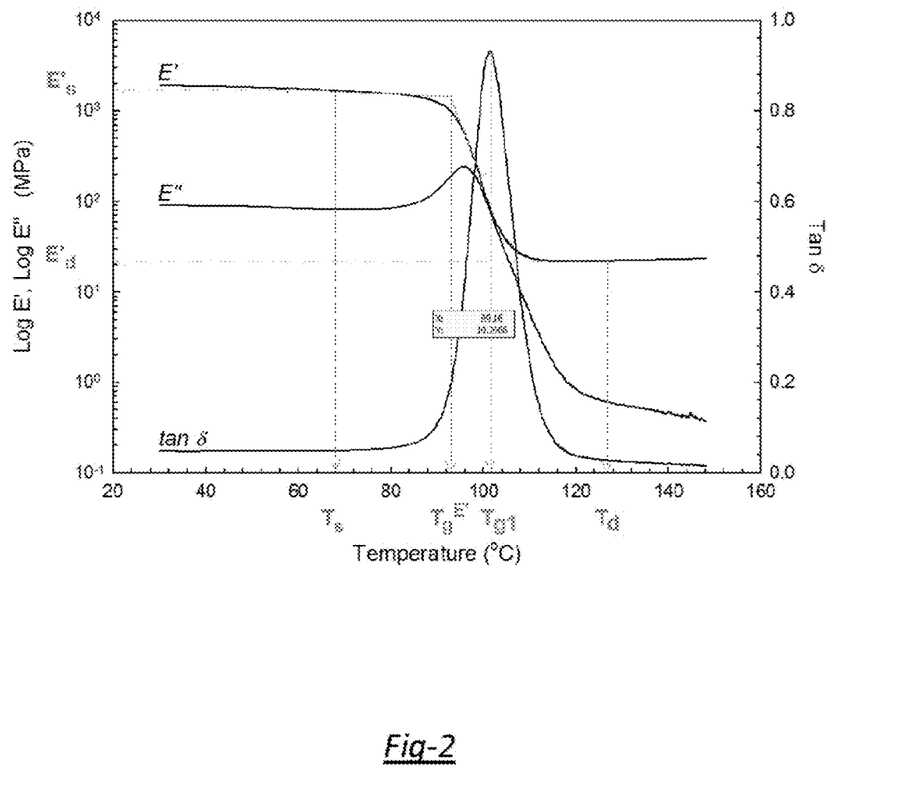
FIG. 2 is a graphical representation of a representative relationship between various equilibrium mechanical properties of the polymer of FIG. 1.

Referring to FIG. 2, the resulting data is plotted for each Example to graphically compare Log E' (MPa), Log E" (MPa), temperature (° C.), and tan δ. The onset of the glass transition temperature, $T_g^{E'}$, is determined at an intersection of a first tangent and a second tangent to the storage modulus (E') curve at a transition drop, as shown in FIG. 2. The first tangent is anchored prior to the transition drop, and the second tangent is anchored at an inflection point of the transition drop, as shown in FIG. 2. The glass transition temperature, $T_g$, corresponds to an apex of the tan δ curve, and the shape memory transformation temperature, $T_{trans}$, coincides with the glass transition temperature, $T_g$. The setting temperature, $T_s$, for a shape memory effect is the temperature below the glass transition temperature, $T_g$, at which tan δ returns to a flat baseline and becomes independent of temperature. The deformation temperature, $T_d$, for the shape memory effect is the temperature above the glass transition temperature, $T_g$, at which tan δ returns to a flat baseline and becomes independent of temperature. The glassy storage modulus, $E'_s$, at the setting temperature, $T_s$, and the rubbery storage modulus, $E'_d$, at the deformation temperature, $T_d$, are also recorded.

The molecular weight between crosslink points ($M_c$) of each polymer is also measured, and crosslink density ($1/M_c$) is determined for each of the polymers of Examples 1-13.

Thermal Properties

Thermal properties of each of the polymers of Examples 1-13 are evaluated with a TA Instruments Q2000 differential scanning calorimeter (DSC) equipped with a refrigerated cooling system (RCS). Fifteen to 20 mg of each sample is encapsulated in separate T-Zero® aluminum pans and evaluated according to the following thermal program: 1) equilibrate at −90° C. and 2) heat/cool/heat at 10° C./min up to 60° C. with a 2 minute isothermal step between cooling and heating steps to ensure thermal equilibrium. One or more (1, 2, . . . , n) glass transition temperatures, $T_{g1}, T_{g2}, \ldots, T_{gn}$, is measured for each of the polymers of Examples 1-13 using the data collected during step 2) and Universal Analysis software. A melting temperature, $T_m$, is measured for each of components D1-D4 and M1-M4.

Six to 7 mg of each of components A and B is encapsulated in separate T-Zero® hermetic aluminum pans. Each of the components is evaluated according to the following thermal program: 1) equilibrate at −90° C., 2) heat to 150° C. at 10° C./min, 3) hold isothermally at 150° C. for 2 minutes, 4) cool to −90° C. at 10° C./min, 5) hold isothermally at −90° C. for 2 minutes, and 6) reheat to 150° C. at 10° C./min. The glass transition temperature, $T_g$, is measured for each component using the data collected during steps 2) and 6) and Universal Analysis software. Step 6) allows for direct comparison of specimens having identical thermal history.

Phase Behavior Characterization

Each of the polymers of Examples 1-13 is cryo-fractured to provide a fractured surface. Thereafter, the fractured surface of each polymer is gold plated for further probing using one of a Hitachi S-4800 Field Emission Scanning Electron Microscope or a Zeiss NVision 40 Focused Ion Beam-Field Emission Scanning Electron Microscope at 3 kV.

Qualitative Evaluation of Shape Memory Behavior

Two rectangular 12.7 mm×38.1 mm specimens from the 3 mm-thick plaques of each of the polymers of Examples 1-13 are machined. Each rectangular specimen is then equilibrated at the respective deformation temperature, $T_d$, in a preheated oven. After equilibration, each specimen is removed from the oven and immediately manually deformed from a first rectangular shape (shown at 14 in FIG. 1) to a second "C" shape (shown at 12 in FIG. 1), and subsequently cooled to room temperature in a water bath to thereby fix the second "C" shape 12.

A first deformed specimen (the "C" shape shown at 12 in FIG. 1) of each of the polymers of Examples 1-13 is then immediately heated to the respective deformation temperature, $T_d$, in a preheated oven to thereby recover the first rectangular shape 14. A shape reversal time from the second "C" shape 12 to the first rectangular shape 14 is measured from the time of insertion into the preheated oven to the time of full shape recovery.

A second deformed specimen (the "C" shape shown at 12 in FIG. 1) of each of the polymers of Examples 1-13 is maintained at room temperature in air for 2 hours to evaluate prolonged shape fixing capability of each polymer. Subsequently, the second deformed specimen is heated to the respective deformation temperature, $T_d$, in a preheated oven to thereby recover the first rectangular shape 14. A shape reversal time from the second "C" shape 12 to the first rectangular shape 14 is measured from the time of insertion into the preheated oven to the time of full shape recovery.

Indentation and Scratch Tests

Each of the polymers of Examples 1-13 is evaluated on a CSM Instruments Nano Scratch Tester/Micro Combi Tester using Scratch 4.12 software. Each of the polymers is indented and/or scratched at four or five increasing loads of 200 N, 800 N, 1,400 N, and 2,000 N using a 90°, 50 μm radius spheroconical indenter. Images of the indented and/or scratched specimens are recorded upon completion of the tests of each specimen. Each specimen is heated in a convection oven at the deformation temperature, $T_d$, of each polymer, and a recovery of the indentation and/or scratch is visually evaluated.

The results of each of the aforementioned evaluations are summarized in Tables 2-4, wherein the nomenclature "NA" refers to a non-applicable quantity or relationship and the nomenclature "n.m." refers to a non-measurable quantity or relationship.

TABLE 2

Glass Transition Temperature ($T_g$), Setting Temperature ($T_s$), Deformation Temperature ($T_d$), Melting Temperature ($T_m$), Storage Modulus at $T_s$ ($E'_s$) and $T_d$ ($E'_d$), and Crosslink Density ($1/M_c$)

| Sample | $E'_s$ (MPa) | $E'_d$ (MPa) | $T_m$ (°C.) | $T_g = T_{trans}$ (°C.) | $T_s$ (°C.) | $T_d$ (°C.) | $1/M_c$ (mol/g) |
|---|---|---|---|---|---|---|---|
| Ex. 1 | 1839 | 10.0 | n.m. | 37 | −10 | 72 | 0.00160 |
| Ex. 2 | 2279 | 12.1 | 43 | 54 | 11 | 90 | 0.00144 |
| Ex. 3 | 1953 | 16.7 | 41 | 62 | 13 | 96 | 0.00139 |
| Ex. 4 | 1873 | 16.9 | 43 | 66 | 25 | 101 | 0.00139 |
| Ex. 5 | 2185 | 18.1 | 43 | 64 | 15 | 99 | 0.00190 |
| Ex. 6 | 2258 | 18.3 | 43 | 63 | 1 | 103 | 0.00186 |
| Ex. 7 | 1752 | 24.9 | 50 | 99 | 68 | 125 | 0.00224 |
| Ex. 8 | 1995 | 22.8 | 49 | 93 | 49 | 123 | 0.00219 |
| Ex. 9 | 2372 | 11.3 | 126 | 60 | 3 | 96 | 0.00153 |
| Ex. 10 | 2280 | 15.2 | 144 | 57 | −4 | 93 | 0.00166 |
| Ex. 11 | 1294 | 14.9 | 60 | 98 | 62 | 126 | 0.00174 |
| Ex. 12 | 2172 | 14.5 | 50 | 63 | −6 | 105 | 0.00174 |
| Ex. 13 | 1538 | 8.9 | 45 | 79 | 33 | 115 | 0.00158 |

TABLE 3

Damage Recovery (Indentation and Scratch) and Shape-Memory Behavior

| Sample | Indentation Tested? | Scratch Tested? | Damage (Indentation + Scratch) Recovery? | Shape-Memory at $T_{trans}$? |
|---|---|---|---|---|
| Ex. 1 | Yes | Yes | Complete | Yes |
| Ex. 2 | Yes | No | NA | Yes |
| Ex. 3 | Yes | No | NA | Yes |
| Ex. 4 | Yes | No | NA | Yes |
| Ex. 5 | Yes | No | NA | Yes |
| Ex. 6 | Yes | Yes | Complete | Yes |
| Ex. 7 | Yes | No | NA | Yes |
| Ex. 8 | Yes | No | NA | Yes |
| Ex. 9 | Yes | No | NA | Yes |
| Ex. 10 | Yes | No | NA | Yes |
| Ex. 11 | Yes | No | NA | Yes |
| Ex. 12 | Yes | Yes | Complete | Yes |
| Ex. 13 | Yes | Yes | Incomplete | Yes |

TABLE 4

Molecular Weight, Melting Temperature ($T_m$), and Ratio of Ethylene Oxide (EO) to Propylene Oxide (PO) of Second Crosslinking Agents

| PEA2 | Molecular Weight (g/mol) | Measurable Melting Transition Temperature? ($T_m$) | EO/PO in CA2 (mol:mol) |
|---|---|---|---|
| D1 | 148 | No (−34° C.) | ∞ |
| D2 | 230 | No (−86° C.) | 0 |
| D3 | 900 | Yes (18° C.) | 2.08 |
| D4 | 2,000 | Yes (33° C.) | 6.67 |
| M1 | 600 | No (−85° C.) | 0.11 |
| M2 | 1,000 | Yes (24° C.) | 6.25 |
| M3 | 2,000 | No (−72° C.) | 0.21 |
| M4 | 2,000 | Yes (0° C.) | 3.13 |

Varying Ratio of Second Crosslinking Agent to First Crosslinking Agent

As shown in Table 2, each of the polymers of Examples 1-4 includes a reaction product of the same components, i.e., components ER1, D1, and D3. However, each of the polymers of Examples 1-4 includes a reaction product of a different ratio of the second crosslinking agent, component D3, to the first crosslinking agent, component D1.

As the ratio of the second crosslinking agent to the first crosslinking agent varies, the glass transition temperature, $T_g$, of the polymers of Examples 1-4 also varies. Therefore, the glass transition temperature, $T_g$, may be tailored according to the ratio of the second crosslinking agent to the first crosslinking agent. In particular, by varying the ratio of the second crosslinking agent to the first crosslinking agent from 0.25 to 1.02, the glass transition temperature, $T_g$, i.e., the shape memory transformation temperature, $T_{trans}$, of the polymers may be tailored from 37° C. to 66° C. Therefore, as the ratio of the second crosslinking agent to the first crosslinking agent of the polymers of Examples 1-4 decreases, the glass transition temperature, $T_g$, increases.

Varying Crosslink Density, $1/M_c$

As shown in Table 2, each of the polymers of Examples 1-4 includes a reaction product of the same components, i.e., components ER1, D1, and D3. However, each of the polymers of Examples 1-5 has a different crosslink density, $1/M_c$. By comparison, each of the polymers of Examples 5 and 7 includes a reaction product of similar components to the polymers of Examples 1-4, i.e., components ER2, D1, and D3. However, the polymers of Examples 5 and 7 also have a different crosslink density, $1/M_c$, than each of the polymers of Examples 1-4.

As the crosslink density, $1/M_c$, of the polymers of Examples 1-4, 5, and 7 varies, the glass transition temperature, $T_g$, of the polymers also varies. Therefore, the glass transition temperature, $T_g$, may be tailored according to crosslink density, $1/M_c$. In particular, by varying the crosslink density, $1/M_c$, of the polymers from 0.00139 to 0.00224, the glass transition temperature, $T_g$, i.e., the shape memory transformation temperature, $T_{trans}$, of the polymers may be tailored from 37° C. to 99° C.

However, as shown in Table 2, variations in the crosslink density, $1/M_c$, and glass transition temperature, $T_g$, may not follow the same trend. That is, as crosslink density, $1/M_c$, decreases, the glass transition temperature, $T_g$, of the polymer may not necessarily only increase or only decrease. Rather, the relationship between crosslink density, $1/M_c$, and glass transition temperature, $T_g$, may reverse at a specific crosslink density, $1/M_c$. Without intending to be limited by theory, such trend reversal may be attributable to a change in a molecular compatibility of the components of the polymers of Examples 1-4, 5, and 7.

Varying Second Molecular Weight for Similar Crosslink Densities, $1/M_c$

As shown in Table 2, the polymer of Example 5 exhibits a similar crosslink density, $1/M_c$, to the polymer of Example 6. However, as shown in Table 4, the polymer of Example 5 includes the second crosslinking agent (component D3) having a second molecular weight of approximately 900 g/mol, and the polymer of Example 6 includes the second crosslinking agent (component D4) having a second molecular weight of approximately 2,000 g/mol. Despite the difference in second molecular weights, however, the glass transition temperature, $T_g$, of each of the polymers of Examples 5 and 6 is substantially similar.

Likewise, the polymer of Example 7 exhibits a similar crosslink density, $1/M_c$, to the polymer of Example 8. However, the polymer of Example 7 includes the second crosslinking agent (component D3) having a second molecular weight of approximately 900 g/mol, and the polymer of Example 8 includes the second crosslinking agent (component D4) having a second molecular weight of approximately 2,000 g/mol. Despite the difference in second molecular weights, however, the glass transition temperature, $T_g$, of each of the polymers of Examples 7 and 8 is substantially similar.

Therefore, polymers having similar crosslink densities, $1/M_c$, and formed from a reaction product including second crosslinking agents having differing second molecular weights, may have substantially similar thermal and mechanical properties, e.g., $T_g$, $T_m$, $E'_s$, and $E'_d$.

Varying Ratio of Ethylene Oxide to Propylene Oxide of the Second Crosslinking Agent for Similar Crosslink Densities, $1/M_c$ As shown in Table 2, the polymer of Example 5 exhibits a similar crosslink density, $1/M_c$, to the polymer of Example 6. However, as shown in Table 4, the polymer of Example 5 includes the second crosslinking agent (component D3) having a ratio of ethylene oxide to propylene oxide of 2.08:1, and the polymer of Example 6 includes the second crosslinking agent (component D4) having a ratio of ethylene oxide to propylene oxide of 6.67:1. Despite the difference in the ratio of ethylene oxide to propylene oxide, however, the glass transition temperature, $T_g$, of each of the polymers of Examples 5 and 6 is substantially similar.

Likewise, the polymer of Example 7 exhibits a similar crosslink density, $1/M_c$, to the polymer of Example 8. However, the polymer of Example 7 includes the second crosslinking agent (component D3) having ratio of ethylene oxide to propylene oxide of 2.08:1, and the polymer of Example 8 includes the second crosslinking agent (component D4) having a ratio of ethylene oxide to propylene oxide of 6.67:1. Despite the difference in the ratio of ethylene oxide to propylene oxide, however, the glass transition temperature, $T_g$, of each of the polymers of Examples 7 and 8 is substantially similar.

Therefore, polymers having similar crosslink densities, $1/M_c$, and formed from a reaction product including second crosslinking agents having differing ratios of ethylene oxide to propylene oxide may have substantially similar thermal and mechanical properties, e.g., $T_g$, $T_m$, $E'_s$, and $E'_d$.

Varying Second Molecular Weight and Ratio of Ethylene Oxide to Propylene Oxide of the Second Crosslinking Agent As shown in Table 2, the polymers of Examples 9-12 have comparable crosslink densities, $1/M_c$. However, as shown in Table 4, each of the polymers of Examples 9-12 includes a reaction product of an epoxy (component ER1), the first crosslinking agent (component D1), and different respective ethermonoamines (components M1-M4) of increasing second molecular weight. That is, the ethermonoamine (component M4) of the polymer of Example 12 has a second molecular weight of greater than three times the second molecular weight of the ethermonoamine (component M1) of the polymer of Example 9. In addition, each of the ethermonoamines of Examples 9-12 has a different ratio of ethylene oxide to propylene oxide.

The polymers of Examples 9-12 exhibit both varying glass transition temperatures, $T_g$, ranging from 60° C. to 98° C. and varying mechanical properties, with storage moduli ranging from about 1.3 GPa to about 2.4 GPa in a glassy state, and from about 9 MPa to about 15 MPa in a rubbery state at comparable crosslink density, $1/M_c$.

Monophasic Vs. Biphasic

Moreover, as shown in Table 2, the polymer of Example 11 has a higher glass transition temperature, $T_g$, than the polymer of Example 12. However, as shown in Table 4, the polymers of Examples 11 and 12 each include a second crosslinking agent having the same molecular weight, i.e., approximately 2,000 g/mol. Referring again to Table 4, the ratio of ethylene oxide to propylene oxide in the second crosslinking agent for the polymer of Example 11 (0.21) is less than the ratio of ethylene oxide to propylene oxide for the second crosslinking agent of the polymer of Example 12 (3.13).

Therefore, for the polymers of Examples 11 and 12 including second crosslinking agents having similar molecular weights, as the ratio of ethylene oxide to propylene oxide of the second crosslinking agent decreases for each of the polymers of Examples 11 and 12, glass transition temperature, $T_g$, of the polymer increases. Stated differently, as the ethylene oxide content of the second crosslinking agent of the polymers of Examples 12 and 13 increases, the $T_g$ of the polymer also increases. Without intending to be limited by theory, the ratio of ethylene oxide to propylene oxide of the second crosslinking agent of less than or equal to about 1:1 may contribute to phase separation in the polymer of Example 11. That is, decreasing the ratio of ethylene oxide to propylene oxide may promote formation of a first, epoxy-rich phase and a second, polyether-rich phase, wherein the first phase is immiscible within the second phase. These results may be attributable to a comparatively lower compatibility between ethylene oxide segments and the epoxy resin (component ER1) of the polymer as compared to the compatibility of propylene oxide segments and the epoxy resin.

Moreover, as shown in Table 2, the polymer of Example 11 has a higher glass transition temperature, $T_g$, than the polymer of Example 10. However, as shown in Table 4, the polymer of Example 10 includes a second crosslinking agent having a second molecular weight, i.e., about 1,000 g/mol, that is less than the second molecular weight, i.e., about 2,000 g/mol, of the polymer of Example 11. Referring again to Table 4, the ratio of ethylene oxide to propylene oxide in the second crosslinking agent for the polymer of Example 11 (0.21) is less than the ratio of ethylene oxide to propylene oxide for the second crosslinking agent of the polymer of Example 10 (6.25).

Further, the $T_{trans}$ of the polymer of Example 11 remains higher than 95° C. Without intending to be limited by theory, the excellent $T_{trans}$ may correspond to a first glass transition temperature, $T_{g1}$, of the first, epoxy-rich phase. Therefore, the polymer of Example 11, which includes a second crosslinking agent having a ratio of ethylene oxide to propylene oxide of less than 1:1, exhibits an enhanced transformation temperature, $T_{trans}$, as compared to the polymers of Example 10 and Example 12.

Figure 3A:
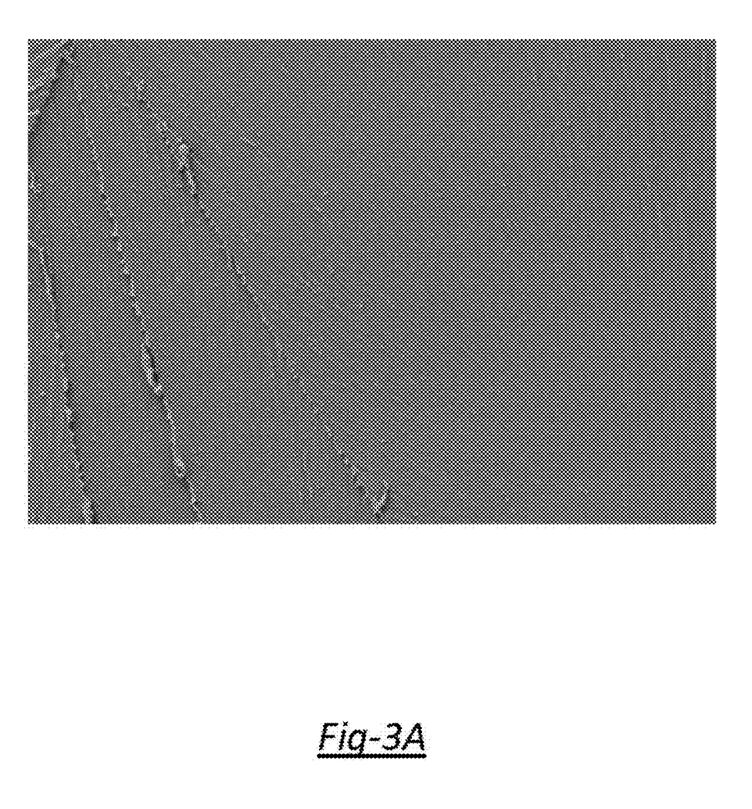
FIG. 3A is a scanning electron micrograph of a monophasic polymer including a second crosslinking agent having a molecular weight of approximately 2,000 g/mol and a ratio of ethylene oxide to propylene oxide of greater than 1:1.
Figure 3B:
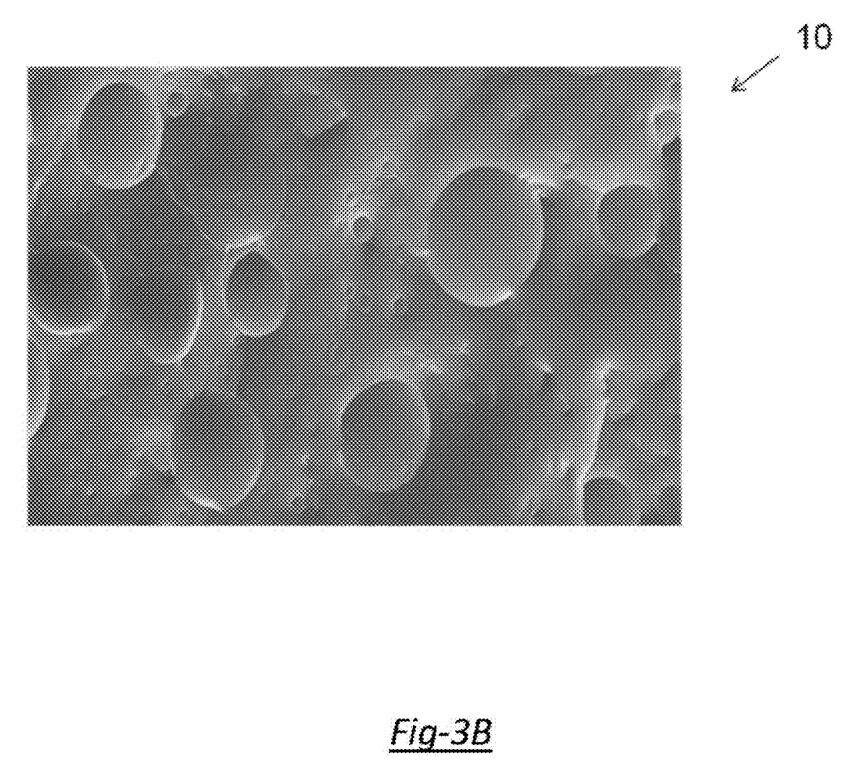
FIG. 3B is a scanning electron micrograph of the polymer of FIG. 1, wherein the polymer is biphasic and includes a second crosslinking agent having a molecular weight of approximately 2,000 g/mol and a ratio of ethylene oxide to propylene oxide of less than 1:1.

Referring now to FIGS. 3A and 3B, a scanning electron micrograph of the polymer of Example 12 (FIG. 3A) after cryo-fracture, as described above, is compared to a scanning electron micrograph of the polymer of Example 11 (FIG. 3B) after cryo-fracture. The scanning electron micrograph of FIG. 3A indicates that the polymer of Example 12 is monophasic, i.e., the polymer of Example 12 exists only as a single, continuous phase. In contrast, the scanning electron micrograph of FIG. 3B indicates that the polymer of Example 11 is biphasic, i.e., the polymer of Example 11 exists as a continuous phase and a globular, dispersed phase. The continuous phase may correspond to the first, epoxy-rich phase set forth above, and the globular, dispersed phase may correspond to the second, polyether-rich phase set forth above.

As such, phase separation within the polymer of Example 11 may be induced by increasing the molecular weight of the second crosslinking agent of the polymers and/or by decreasing a ratio of ethylene oxide to propylene oxide of the second crosslinking agent of the polymer. A combination of both increasing the length of the second crosslinking agent relative to the first crosslinking agent, and varying a ratio of ethylene oxide to propylene oxide with respect to the epoxy resin may promote formation of the first, epoxy-rich phase and the second, polyether-rich phase. The resulting biphasic polymer of Example 11 exhibits excellent shape-memory properties, while simultaneously maintaining a high transformation temperature, $T_{trans}$. The biphasic polymer of Example 11, provided by the combination of increased length of the second crosslinking agent and a select ratio of ethylene oxide to propylene oxide with respect to the epoxy resin, may be toughened as compared to monophasic polymers. The toughening of the biphasic polymers may contribute to the excellent shape-memory properties and simultaneous high transformation temperatures, $T_{trans}$, of the biphasic polymers as compared to the monophasic polymers.

Shape-Memory Behavior

Notwithstanding the above results, each of the polymers of Examples 1-13 is evaluated for shape-memory properties. That is, each of the polymers is evaluated to determine whether the polymer is transformable between the first shape 14 (FIG. 1) and the second shape 12 (FIG. 1) at the transition temperature, $T_{trans}$. As summarized in Table 3, each of the polymers of Examples 1-13 exhibits excellent shape-memory behavior and is transformable between the first shape 14 and the second shape 12 at the transition temperature, $T_{trans}$.

More specifically, each of the polymers of Examples 1-13 exhibits excellent and durable shape fixing with no noticeable recovery while maintaining the deformed specimens at room temperature under no stress/strain. Moreover, each polymer exhibits excellent shape recovery both after instantaneous deformation and fixing, and after a 2-hour shape fixing as set forth above.

Surface Damage Repair

As shown in Table 3, each of the polymers of Examples 1, 6, and 12 are scratch- and indentation-tested as set forth above. That is, each of the polymers is scratched and indented at room temperature, which is below the transformation temperature, $T_{trans}$, of each specimen. Therefore, the damage, which is a combination of polymer removal (scratch) and deformation (indentation) is maintained by the surface of each specimen, as shown in FIG. 4A. However, after each of the polymers of Examples 1, 6, and 12 is heated to above the shape memory deformation temperature, $T_d$, of the respective polymer, which is higher than the transformation temperature, $T_{trans}$, of the respective polymer, each specimen exhibits complete recovery of both the scratch and indentation, as shown in FIG. 4B.

Figure 5A:
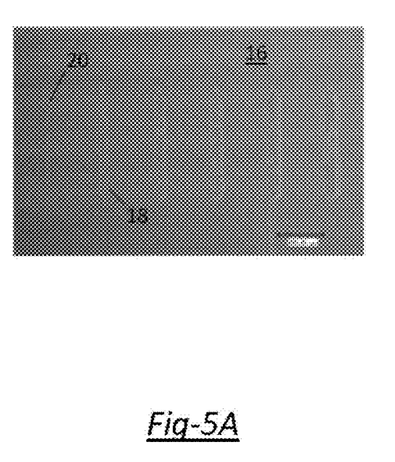
FIG. 5A is an image of the polymer of Example 13, wherein a surface of the polymer defines a scratch and an indentation.
Figure 5B:
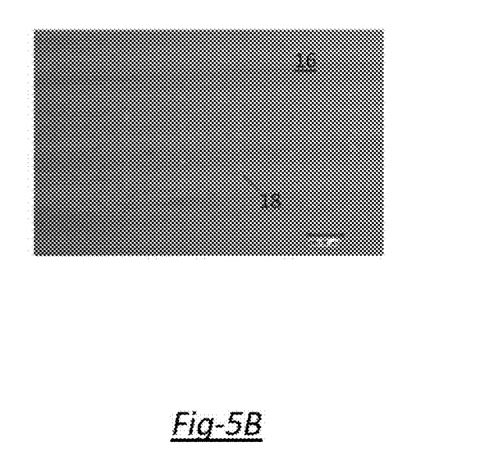
FIG. 5B is an image of the polymer of FIG. 5A after the polymer is heated to above a transformation temperature of the polymer.

The polymer of Example 13 is also scratch- and indentation-tested as set forth above, and the damage is maintained by the surface of the specimen, as shown in FIG. 5A. However, in contrast, after the polymer of Example 13 is heated to above the shape memory deformation temperature, $T_d$, of the polymer, which is higher than the transformation temperature, $T_{trans}$, of the polymer, the specimen only exhibits indentation recovery. That is, the polymer of Example 13 does not exhibit scratch recovery, and as such, exhibits only incomplete damage recovery, as shown in FIG. 5B.

As a non-limiting theory, the difference in damage recovery between the polymers of Examples 1, 6, and 12 and the polymer of Example 13, may be attributable to the phase behavior of the respective second crosslinking agents of the polymers. More specifically, as shown in Table 4, the second crosslinking agents of the respective polymers of Examples 1, 6, and 12 (components D3, D4, and M4) each have a measureable melting temperature, $T_m$. In contrast, however, the second crosslinking agent (component M3) of the polymer of Example 13 does not have a measurable melting temperature, $T_m$.

In addition, the second crosslinking agent (component M3) of the polymer of Example 13 has a higher propylene oxide content, i.e., lower ratio of ethylene oxide to propylene oxide, than each of the second crosslinking agents (components D3, D4, and M4) of the polymers of Examples 1, 6, and 12. Propylene oxide may be generally less likely to crystallize than ethylene oxide as a result of a pendant methyl side group. Therefore, the second crosslinking agent (component M3) of the polymer of Example 13 may be less likely to crystallize and not exhibit a melting temperature, $T_m$. By comparison, the second crosslinking agents (components D3, D4, and M4) of the polymers of Examples 1, 6, and 12 have a higher ethylene oxide content, i.e., a lower propylene oxide content, and as such may be more likely to crystallize and exhibit a melting temperature, $T_m$.

As such, while indentation or deformation repair may be attributable to the shape-memory behavior of the polymers as set forth above, scratch repair may only be attributable to polymers including a crystallizable second crosslinking agent, i.e., a second crosslinking agent with a measurable melting temperature, $T_m$, such as provided by a comparatively high propylene oxide content. That is, the polymers of Example 1, 6, and 12 may repair scratches via melting of micro-crystalline sites formed within the networks of the respective second crosslinking agents.

While the best modes for carrying out the disclosure have been described in detail, those familiar with the art to which this disclosure relates will recognize various alternative designs and embodiments for practicing the disclosure within the scope of the appended claims.

The invention claimed is:

1. A polymer comprising a reaction product of:
   an epoxy resin;
   a first crosslinking agent reactive with said epoxy resin and having a first molecular weight; and
   a second crosslinking agent reactive with said epoxy resin, wherein said second crosslinking agent is an amine having a polyether backbone, at least one amino group attached to said polyether backbone, and a second molecular weight of at least 2.5 times greater than said first molecular weight;
   wherein the polymer has a first phase having a first glass transition temperature at which the polymer is transformable between a first shape and a second shape;
   wherein said second crosslinking agent is crystallizable within the polymer and thereby has a melting temperature that is detectable within the polymer;
   wherein said polyether backbone includes ethylene oxide and propylene oxide.

2. The polymer of claim 1, wherein said second crosslinking agent includes at least one pendant group covalently crosslinked to said epoxy resin and at least one pendant group mobile within the polymer at a temperature greater than said melting temperature.

3. The polymer of claim 1, wherein said second molecular weight is from approximately 600 g/mol to approximately 2,000 g/mol.

4. The polymer of claim 3, wherein said first molecular weight is less than or equal to approximately 250 g/mol.

5. The polymer of claim 1, wherein said epoxy resin is present in said first phase in an amount of greater than 50 parts by weight based on 100 parts by weight of said first phase.

6. The polymer of claim 1, wherein said first glass transition temperature is greater than or equal to about 35° C.

7. The polymer of claim 1, wherein the polymer further has a second phase having a second glass transition temperature that is lower than said first glass transition temperature.

8. The polymer of claim 1, wherein said second crosslinking agent is an etherdiamine having a second molecular weight of from approximately 900 g/mol to approximately 2,000 g/mol.

9. The polymer of claim 1, wherein said second crosslinking agent is an ethermonoamine having a second molecular weight of from approximately 600 g/mol to approximately 2,000 g/mol.

10. The polymer of claim 1, wherein a ratio of ethylene oxide to propylene oxide in said second crosslinking agent is less than about 1:1.

11. A polymer comprising a reaction product of:
    an epoxy resin;
    a first amine reactive with said epoxy resin and having a first molecular weight of less than or equal to approximately 250 g/mol; and
    a second amine reactive with said epoxy resin, wherein said second amine has a polyether backbone, at least one amino group attached to said polyether backbone, and a second molecular weight of greater than or equal to approximately 600 g/mol;
    wherein the polymer has a first phase having a first glass transition temperature and a second phase having a second glass transition temperature that is lower than said first glass transition temperature;
    wherein the polymer is transformable between a first shape and a second shape at said first glass transition temperature;
    wherein said second amine is crystallizable within the polymer and thereby has a melting temperature that is detectable within the polymer;
    wherein said second amine includes at least one pendant group covalently crosslinked to said epoxy resin and at least one pendant group mobile within the polymer at a temperature greater than said melting temperature;
    wherein said polyether backbone includes ethylene oxide and propylene oxide.

12. The polymer of claim 1, wherein said epoxy resin is a diglycidyl ether of bisphenol-A-based epoxy resin.

13. The polymer of claim 11, wherein said second amine is an oligomeric etherdiamine.

14. The polymer of claim 11, wherein said second amine is an oligomeric ethermonoamine.

15. The polymer of claim 11, wherein a ratio of ethylene oxide to propylene oxide in said second amine is less than about 0.5:1.

16. A polymer comprising a reaction product of:
    a diglycidyl ether of bisphenol-A-based epoxy resin;
    a first etheramine reactive with said diglycidyl ether of bisphenol-A-based epoxy resin and having a first molecular weight of less than or equal to approximately 250 g/mol; and
    a second oligomeric etheramine reactive with said diglycidyl ether of bisphenol-A-based epoxy resin and having a second molecular weight of greater than or equal to approximately 600 g/mol;
    wherein the polymer has a first phase having a first glass transition temperature and a second phase having a second glass transition temperature that is lower than said first glass transition temperature;
    wherein the polymer is transformable between a first shape and a second shape at said first glass transition temperature;
    wherein said second oligomeric etheramine has a polyether backbone including ethylene oxide and propylene oxide in a ratio of ethylene oxide to propylene oxide of from about 0.1:1 to about 0.5:1;
    wherein said second oligomeric etheramine is crystallizable within the polymer and thereby has a melting temperature that is detectable within the polymer;
    wherein said second oligomeric etheramine includes at least one pendant group covalently crosslinked to said diglycidyl ether of bisphenol-A-based epoxy resin and at least one pendant group mobile within the polymer at a temperature greater than said melting temperature.

* * * * *